United States Patent
Elsel

[11] 3,709,059
[45] Jan. 9, 1973

[54] TRANSMISSION FOR THE FEEDING MOVEMENT OF MECHANICAL CARRIAGE UNITS OF MACHINE TOOLS

[75] Inventor: Karl Heinz Elsel, Aldingen, Germany

[73] Assignee: Karl Huller Gesellschaft mit beschrankter Haftung, Ludwigsburg, Germany

[22] Filed: Sept. 14, 1970

[21] Appl. No.: 72,012

[30] Foreign Application Priority Data

Sept. 13, 1969 Germany............G 69 36 058.3

[52] U.S. Cl................74/661, 74/640, 74/665 E, 192/18 B
[51] Int. Cl......F16h 35/00, F16h 37/06, F16d 67/06
[58] Field of Search.....74/640, 661, 665 E; 192/18 B

[56] References Cited

UNITED STATES PATENTS

| | | |
|---|---|---|
| 2,781,674 | 2/1957 | Kaerger....................74/661 |
| 3,006,215 | 10/1961 | Musser.....................74/665 E |
| 3,251,444 | 5/1966 | Erban......................192/84 C |
| 3,565,006 | 2/1971 | Stewart....................74/640 X |

Primary Examiner—Arthur T. McKeon
Attorney—Walter Becker

[57] ABSTRACT

A transmission for connecting a variable speed feed shaft and a constant speed fast traverse shaft to an output shaft which, in turn, can be connected to a machine tool carriage. The transmission includes an internal gear driven via a friction clutch by the fast traverse shaft and adapted to be held by a friction brake. A sleeve-like flexible internal gear having a different number of teeth than said internal gear and smaller than said internal gear is connected to the output shaft and is disposed inside the internal gear. A cam rotor driven by the feed shaft is disposed inside the flexible gear and forces at least one circumferential portion thereof into meshing engagement with said internal gear.

18 Claims, 2 Drawing Figures

TRANSMISSION FOR THE FEEDING MOVEMENT OF MECHANICAL CARRIAGE UNITS OF MACHINE TOOLS

The present invention concerns a transmission, especially for the feeding movement of mechanical carriage units of machine tools or the like, with an output shaft which is adapted selectively to be operatively connected with a fast traverse drive and a feed drive through the intervention of transmission stages in a transmission housing.

It is an object of the present invention to provide a transmission of the above mentioned type which, while being simple in construction and having a high speed precision, will permit the setting of greatly different transmission ratios.

This object and other objects and advantages of the invention will appear more clearly from the following specification in connection with the accompanying drawings, in which.

Figure 1:
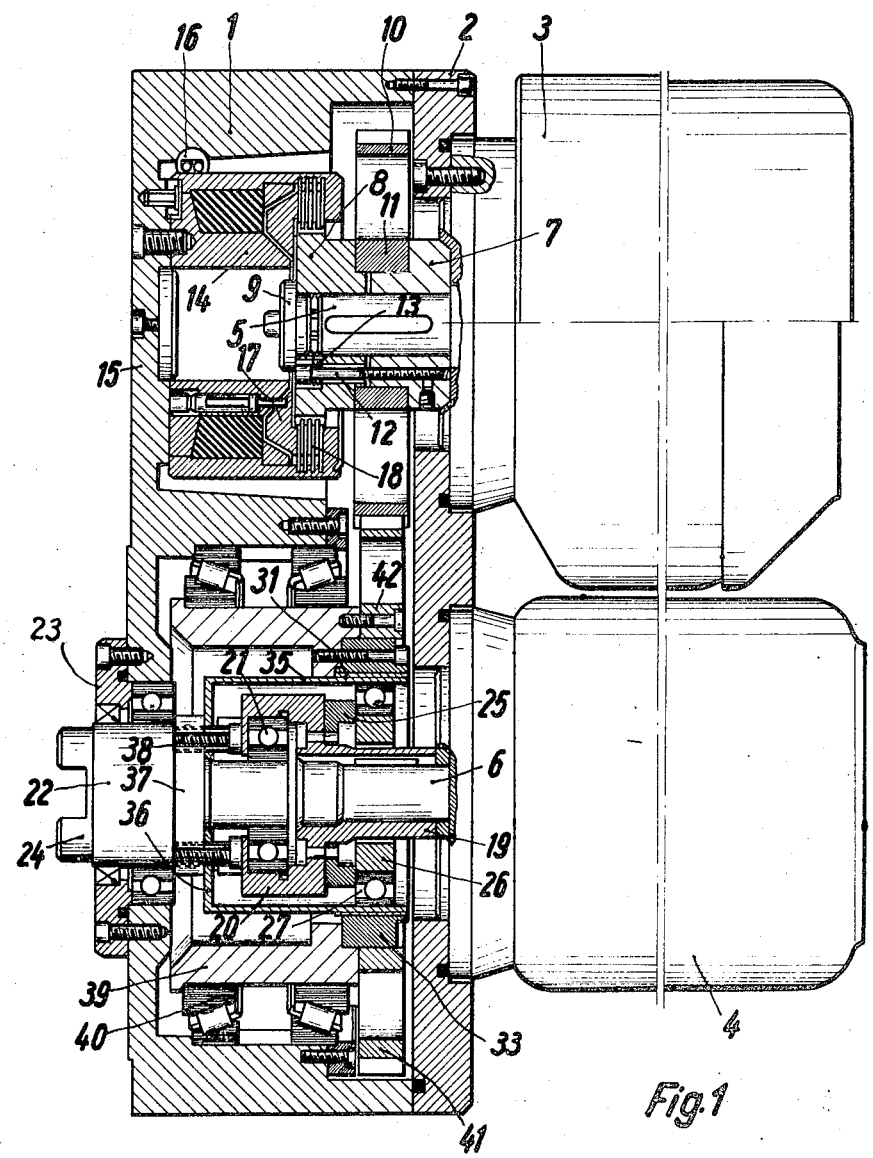
FIG. 1 is an axial section through a transmission according to the invention.

The transmission according to the present invention is characterized primarily in that one transmission stage has an inner rotor the cross-section of which differs from a circular shape and may, for instance, be elliptical, which inner rotor is surrounded by a flexible intermediate ring of corresponding shape which is provided with positive engaging elements, such as teeth, which elements engage correspondingly shaped positive engaging elements of the same pitch but of different number provided on the circular inner side of a form-retaining outer rotor, one rotor being drivingly connected to the fast traverse drive and the other rotor being drivingly connected to the feed drive while the output shaft is drivingly connected to the intermediate ring. Depending on which of the two rotors is being driven, different speeds will be obtained on the output shaft. These speeds of the output shaft may additionally be varied within a wide range by driving both rotors simultaneously to thereby superimpose their movements.

In order to make it possible in a simple manner to drive exclusively one rotor, at least one rotor, especially the outer rotor, has associated therewith a brake which preferably is coaxial with the shaft axis of the pertaining drive, especially a friction brake, so that this rotor can also be arrested when the other rotor is being driven exclusively.

In order to obtain a compact construction of the transmission according to the invention, the outer rotor is through a transmission, preferably a spur gear transmission stage, connected to the pertaining drive.

For purposes of elastically driving the outer rotor by the pertaining drive, the outer rotor is through the intervention of a friction clutch connected to its drive while the friction clutch is preferably in a space-saving manner arranged on the shaft of the pertaining drive.

According to a particularly simple embodiment of the invention, the spur gear which is arranged on the shaft of the drive of the outer rotor is located between two follower rings of the friction clutch which preferably are connected to the brake in such a way that also the brake can be arranged directly adjacent to the friction clutch and the spur gear therebetween.

The brake has a high degree of efficiency in spite of its small dimensions when it is designed as a spring-pressure-brake.

The further reduction in the dimensions of the transmission according to the invention has been realized by the fact that the outer rotor is at least partially arranged in the pertaining gear of the gear transmission stage and is connected to said gear. Expediently, the outer rotor and/or the pertaining gear of the spur gear transmission is connected to a sleeve which may be safely journalled in the transmission housing.

The inner rotor may, for instance, be journalled in a particularly safe manner by having it through the intervention of a sleeve, preferably within the intermediate ring, rotatably journalled on the output shaft.

For purposes of connecting the intermediate ring to the output shaft, the intermediate ring is formed by a sleeve which by means of an end face portion is flanged to a collar of the output shaft. Expediently, for purposes of reducing the friction, the intermediate ring is through an antifriction bearing, such as a ball bearing, supported on the circumference of the inner rotor.

According to a preferred embodiment of the invention, the outer rotor is connected to the fast traverse drive, and the inner rotor is connected to the feed drive so that in spite of a very simple construction favorable transmission ratios can be realized. For example, it is possible to produce sine-shaped movements by a successive turning-on and turning-off and by a superimposing of the driving movements so that a fast adjusting movement of the carriage, subsequently a transition to the feeding movement and then a fast retracting movement of the carriage can be realized.

In order to have available a great number of different feeding speeds, the feed drive is adapted so as to be infinitely variably controllable.

According to a further development of the invention, the drives are formed by separate motors, preferably a direct current motor for the feed drive and a three-phase current motor for the fast traverse drive. The direct current motor makes it possible in a very simple manner to realize a stepless speed control.

In order to permit a simple connection of the transmission while not interfering with a good accessibility of the transmissions, the transmissions are provided on a bearing bracket which is preferably formed by a housing cover. The said transmissions are mounted on that side of the housing which faces away from the drive shaft.

Referring now to the drawings in detail, FIG. 1 illustrates a transmission according to the invention with a housing 1 which is closed at one end face side by means of a detachable cover 2 which is plane and in the shape of a bearing bracket. Mounted on the outside of the cover 2 are two superimposed driving motors 3 and 4 which are flanged in an axis-parallel manner while the drive shafts 5, 6 of motors 3, 4 extend into the housing.

On the output shaft 5 of the upper drive motor 3 designed as three-phase current motor, there are provided two friction rings 7, 8 of a friction clutch. These friction rings are non-rotatable but are axially displaceable while they are secured by an end collar 9 on shaft 5 against excessive axial displacements. The two rings 7, 8 extend around the hub 11 of a gear 10 at the two end face sides thereof. This gear in the form of gear 10 is located directly adjacent to the housing cover 2.

The two rings 7, 8 are connected to each other by eight screws 12 which are uniformly distributed over the circumference of the rings 7, 8 and are axis-parallel thereto. By means of the screws 12, axially effective dish springs 13 are held which place the two rings 7, 8 under a resilient load with regard to each other and against the end faces of the hub 11.

In the axis of shaft 5 of motor 3, in housing 1 and, more specifically, on the housing wall 15 which is located opposite the cover 2, a spring-pressure-brake 14 is connected which is to be actuated electromagnetically and is adapted through a cable 16 to be supplied with the necessary operational current. The rotor 17 of brake 14 which rotor is spring-loaded toward the motor 3, is through laminae 18 connected to the ring 8 adjacent thereto and pertaining to the friction clutch 7, 8. When brake 14 has been disengaged, in conformity with FIG. 1 shaft 5 may be rotated freely by motor 3. If, however, brake 14 is engaged, the rotor 17 will stop the rings 7, 8 and thereby also the gear 10 so that the latter cannot be rotated at all or only to the extent corresponding to the brake moment.

Figure 2:
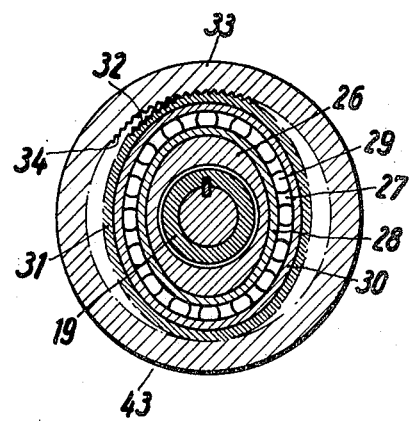
FIG. 2 is a cross-section through the lowermost transmission stage of the transmission of FIG. 1.

As illustrated in FIG. 2, on shaft 6 of the lower drive motor 4 designed as direct current motor, a sleeve 19 is non-displaceably arranged by means of a fitting key. Sleeve 19 protrudes beyond the end of shaft 6 and at the protruding end carries a sleeve section 20 of somewhat larger diameter which section is by means of a ball bearing 21 rotatably journalled on the inner end of the output shaft 22 of the transmission according to the invention. Output shaft 22 is rotatably journalled in the housing wall 15 of the transmission housing 1 and is detachable after a cover 23 has been removed while the output shaft 22 at that end thereof which is located outside the housing 1 has a connecting member 24 for the positive connection with the machine unit or the like to be driven. At that shoulder which faces toward the motor 4, the sleeve 19 designed as reduction sleeve has connected a connecting ring 25 which forms a should ring. The cylinder mantle-shaped section which points toward the motor 4 is connected to an inner rotor 26 which surrounds shaft 6. The inner rotor 26 is, as shown in FIG. 2, of elliptical contour and is made of a shape-retaining material. Arranged on the outer circumference of the inner rotor 26 is the inner likewise shape-retaining race ring 28 of an antifriction bearing 27 while the inner race ring 28 likewise has a corresponding elliptical shape and a ball race groove for balls 29 of the antifriction bearing 27. Arranged on the elliptical outer ring 30 of the antifriction bearing 27 which ring 30 is likewise provided with a ball groove, there is arranged an intermediate ring 31 which has a corresponding elliptical contour. The outer bearing ring 30 as well as the intermediate ring 31 consist of flexible or elastic material. The intermediate ring 31 is at its circumference provided with gear teeth 32. The intermediate ring 31 is surrounded by an outer rotor 33 which at its inner circumference is provided with gear teeth 34. These gear teeth 34 in contrast to the teeth 32 of the intermediate ring 31 are not located on an ellipse but on a circle and their pitch diameter corresponds to the pitch diameter of the gear teeth 32 when measured along the large ellipse axis. The teeth 34 have precisely the same pitch and design as the teeth 32 while, however, the total number of the teeth 34 is, due to the circular shape, slightly higher than the number of the teeth 32. With the illustrated embodiment of the invention, the outer rotor 33 forms a circular ring.

As will be seen from FIG. 1, the intermediate ring 31 forms an end section of a sleeve 35 located toward the cover 2. Sleeve 35 has that end thereof which faces away from the housing cover 2 provided with an annular disc-shaped end wall 36 which surrounds the inner end of the output shaft 22 and is positively connected to a collar 37 of shaft 22 by means of screws 38. The section 20 of the reducing sleeve 19 will thus with ball bearing 21 be located within the sleeve 35.

The outer rotor 33 is centered in the end face of a bearing sleeve 39 which end face faces toward the cover 2. Rotor 33 is positively screwed to the sleeve 39 while the latter surrounds sleeve 35 and with the antifriction bearings 40 is safely journalled in housing 1. The outer rotor 33 is surrounded by the hub 42 of a gear 41 forming a spur gear, which spur gear is likewise screwed to the end face of the bearing sleeve 39 and is in alignment with the gear 10 which means is located directly adjacent to the cover 2. Gear 41 is thus in a positive manner connected to the outer rotor 33.

The transmission stage 43 illustrated in section in FIG. 2 operates as follows: The intermediate ring 31 and the outer rotor 33 are in operative engagement with their teeth 32 and 34 through the large ellipse axis. When the inner rotor 26 is turned by the drive motor 4 and the outer rotor 33 is at a standstill, a stepup or stepdown ratio is obtained which corresponds to the number of teeth of the intermediate ring 31 divided by the difference between this number of teeth and the number of teeth of the outer rotor 33. If a negative prefix is obtained, the intermediate ring 31 and thus the output shaft 22 rotate in a direction opposite to the direction of rotation of shaft 6. This working principle is obtained when brake 14 is engaged and thereby the outer rotor 33 is arrested through the gear 10 and the gear 41.

When, however, the brake 14 is disengaged and the three-phase motor 3 is put into operation, the torque of this motor is through shaft 5 and friction clutch 7, 8 transferred to gear 10 and thereby gear 41 which puts the outer rotor 33 of the transmission stage 43 in motion, in other words rotates the same. The outer rotor 33 will through the intermeshing teeth 34, 32 rotate the intermediate ring 31 and thereby the output shaft 22 so that the output shaft 22 is driven by motor 3 at a ratio which corresponds to the stepup or stepdown ratio of the transmission stage 10, 41. This drive thus corresponds to a fast traverse drive, whereas the drive through the stepless variable speed motor 4 corresponds to the working speed or working drive.

In addition to the described separate operation of the two motors 3, 4, these motors may also simultaneously be operated so that a superimposing of the characteristics of the two described transmission circuits will be obtained. The two shafts 5, 6 may selectively be driven in the same direction or in opposite direction.

The design according to the invention permits a space-saving construction and a favorable arrangement of the motors. Furthermore, an approximately sine-shaped speed characteristic may be obtained at the output shaft 22 and thereby, for instance, of a carriage of a machine tool. The speed of the output shaft 22 may in a stepless manner be easily controlled at a ratio of 1 : 100, for instance, by a rotatable knob while no exchange of change gears and no shifting of belts is necessary in contrast to heretofore known transmissions of the type involved. The carriage may by a shiftover of the direct current motor to rotary magnet behavior be driven against an abutment. Furthermore, by means of the brake 14 an advance safety arrangement is obtained, and a return safety arrangement will be obtained by the friction clutch 8, 7. The transmission according to the invention may be assembled in any desired position. Instead of the direct current motor 4, also a stepping motor or a transmission motor may be employed.

It is, of course, to be understood that the present invention is, by no means, limited to the particular showing in the drawings but also comprises any modifications within the scope of the appended claims.

What is claimed is:

1. In a transmission, especially for a machine tool carriage and operable for transmitting power, a first drive shaft and a second drive shaft, an output shaft; a ring-like first rotor having internal teeth, a noncircular second rotor coaxial with and inside said first rotor, a flexible ring connected to said output shaft and having an axial flange disposed between said first and second rotors and having external teeth meshing with the internal teeth of said first rotor, the number of teeth on said flange being different from the number of teeth on said first rotor, said second rotor pressing at least one circumferential portion of said flange radially outwardly to bring the teeth of said portion into meshing engagement with the teeth of said first rotor, first means connecting said first drive shaft to said first rotor, and second means connecting the said second drive shaft to said second rotor.

2. A transmission according to claim 1 in which said second rotor comprises means defining diametrically opposite holes pressing diametrically opposite portions of said second rotor radially outwardly to dispose the external teeth on said portions in mesh with teeth on said first rotor.

3. A transmission according to claim 1 which includes friction brake means coaxial with said first drive shaft and operatively connected to said first rotor.

4. A transmission according to claim 3 which includes a first gear coaxial with and connected to said first rotor and said first means comprises a second gear meshing with said first gear and coaxial with said first drive shaft.

5. A transmission according to claim 4 which includes friction clutch means connecting said gear with said first drive shaft.

6. A transmission according to claim 5 in which said friction clutch means comprises a pair of rings on said first drive shaft frictionally engaging respective sides of said gear, said friction brake means being connected between one of said rings and a stationary point.

7. A transmission according to claim 3 in which said friction brake means is spring loaded.

8. A transmission according to claim 4 in which said first rotor is disposed at least partly inside said first gear.

9. A transmission according to claim 8 which includes an axial sleeve coaxial with said second shaft and connected to at least one of said first rotor and first gear, said transmission having a housing, and bearing means supporting said sleeve in said housing.

10. A transmission according to claim 1 in which said output shaft is coaxial with said second shaft, a sleeve member fixed to said output shaft and extending toward said second shaft, and bearing means supporting said second rotor on said sleeve member.

11. A transmission according to claim 10 in which said flexible ring comprises an axial extension having an end portion connected to said output shaft.

12. A transmission according to claim 11 which includes antifriction bearing elements disposed between said second rotor and the said axial flange of said flexible ring.

13. A transmission according to claim 1 in which said first drive shaft is a fast transverse drive shaft and said second drive shaft is a feed drive shaft.

14. A transmission according to claim 13 in which said feed drive shaft is infinitely adjustable in speed.

15. A transmission according to claim 14 in which said fast transverse drive shaft is the output shaft of a constant speed electric motor and said feed drive shaft is the output shaft of a direct current electric motor.

16. A transmission according to claim 15 in which said direct current motor is coaxial with said output shaft.

17. A transmission according to claim 16 in which said transmission comprises a housing, said output shaft projecting from one side of said housing, said motors being disposed on the other side of said housing, said housing being open on the side facing said motors, and a cover plate detachably mounted on and closing the open side of said housing, said motors being mounted on said cover plate.

18. In a transmission: an output shaft, an element drivingly connected to said output shaft and comprising an internal gear, an axial sleeve portion, external teeth respectively on said sleeve portion in radially spaced relation to mesh with said internal gear, a cam rotor in said sleeve portion rotatable on the axis of said output shaft, bearing means pressing a portion only of said teeth on said sleeve portion radially outwardly and into meshing engagement with the teeth on said internal gear, a first drive shaft actuated at constant speed, means including a friction clutch connecting said internal gear to said first drive shaft, a brake disposed between said first drive shaft and a stationary point and operable when actuated to hold said first drive shaft against rotation and thereby holding said internal gear against rotation until the slip torque of said friction clutch is exceeded, and a second drive shaft actuated at variable speed and coaxial with said output shaft and connected to said cam rotor, each said drive shaft respectively and said brake being selectively actuatable to provide for a complete range of speeds of said output shaft.

* * * * *